United States Patent [19]

Weldon et al.

[11] Patent Number: 5,936,938
[45] Date of Patent: Aug. 10, 1999

[54] SYSTEM AND METHOD FOR PROVIDING SWITCHING BETWEEN PATHS IN A TELECOMMUNICATIONS SYSTEM

[75] Inventors: Richard S. Weldon, Plano; Dwight W. Doss, Richardson, both of Tex.

[73] Assignee: Alcatel USA Sourcing, L.P., Plano, Tex.

[21] Appl. No.: 08/961,862

[22] Filed: Oct. 31, 1997

[51] Int. Cl.$^6$ ........................................... H04L 1/22
[52] U.S. Cl. ................... 370/228; 340/825.01; 370/220
[58] Field of Search .................... 370/225, 226, 370/227, 228, 217, 218, 219, 220, 221, 222, 223, 224, 249; 379/15, 26; 395/181; 340/825.01, 827

[56] References Cited

U.S. PATENT DOCUMENTS 5,740,157   4/1998   Demiray et al. ..................... 370/219

Primary Examiner—Chau Nguyen
Assistant Examiner—Kenneth Vanderpuye
Attorney, Agent, or Firm—Baker & Botts, L.L.P.

[57] ABSTRACT

An automatic switching system and method is provided for switching between paths in a telecommunications switching system. A first circuit in each path receives substantially identical telecommunications signals containing telecommunications data and transmits substantially identical digital signals containing the telecommunications data. The first circuit is capable of detecting whether errors have occurred during transmission of the telecommunications signals, and of inserting into the digital signals an error indicator if a transmission error has been detected. At least one second circuit in each path accepts the digital signals from the first circuit in a selected path, and is capable of detecting whether the error indicator is present, and automatically switching to accept the digital signals from the first circuit in the non-selected path in response to detection of the error indicator.

16 Claims, 3 Drawing Sheets

| A1 | A2 | C1 |
|---|---|---|
| A1 | A2 | IOL-COM |
| B1 | E1 | F1 |
| B1 | IOL-COM | OHT1 |
| D1 | D2 | D3 |
| OHT2 | OHT3 | OHT4 |
| H1 | H2 | H3 |
| H1 | H2 | H3 |
| K2 | K1 | K2 |
| BC-RTR | CNTL | BCID |
| D4 | D5 | D6 |
| OHT5 | OHT6 | OHT7 |
| D7 | D8 | D9 |
| OHT8 | OHT9 | OHT10 |
| D10 | D11 | D12 |
| OHT11 | OHT12 | OHT13 |
| Z1 | Z2 | K2 |
| OHT14 | OHT15 | OHT16 |
*FIG. 3*
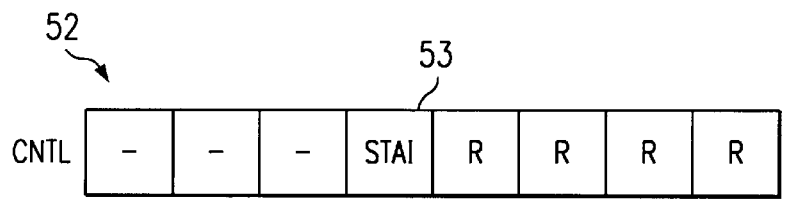
*FIG. 4*
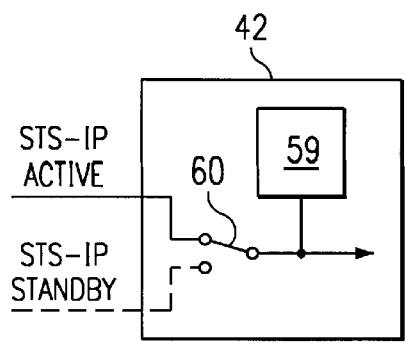
*FIG. 5A*
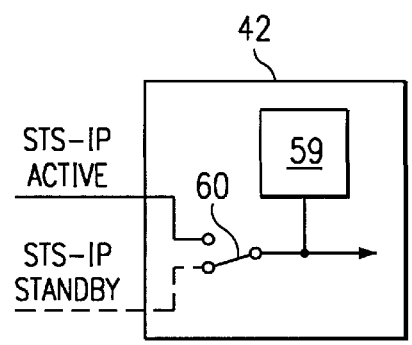
*FIG. 5B*

5,936,938

SYSTEM AND METHOD FOR PROVIDING SWITCHING BETWEEN PATHS IN A TELECOMMUNICATIONS SYSTEM

TECHNICAL FIELD OF THE INVENTION

The present invention relates in general to telecommunications switching, and more particularly to a system and method for automatically switching between data paths in a telecommunications switching system.

BACKGROUND OF THE INVENTION

Modern telecommunications systems typically utilize protection techniques to minimize the possibility of faulty data transmission. One form of protection involves transmitting and processing two or more identical or redundant copies of telecommunications signals in the same manner. In other words, there are identical "paths" through which the respective copies of the redundant signals pass and are processed. One path, however, is typically considered active while the duplicate path is considered standby.

The paths, however, typically exist between a pair of network elements such as telecommunications switching systems where data is switched between conducting media. Because of the redundant paths, when a fault is detected in the signals transmitted on the active path, the receiving telecommunications system can switch to obtain the necessary signals from the standby path, thereby avoiding the need to disrupt transmission or service. It is desirable that this switching between paths be done as rapidly and as simply as possible so that it is effectively transparent to the telecommunications system.

In switching devices and methods previously known, when an error was detected in the signal in the active path, that error had to be communicated to an external control system that was outside the data path and that itself controlled switching operations. Thus, when a transmission error or fault was detected in a telecommunications signal by a device or element of the telecommunications switching system, the fault was communicated to the external control system, and a separate device awaited a command from that external control system before performing necessary switching operations. This method is disadvantageous in that communicating an error or fault to an external control system and awaiting switching instructions from that system takes time, and is itself a process that is subject to transmission faults.

SUMMARY OF THE INVENTION

Accordingly, there is a need for a system and method for switching between paths in a telecommunications switching system that is simple and efficient, and that minimizes communication to and control by an external unit that is outside the data path.

In accordance with the present invention, an automatic switching system is provided for switching between first and second paths in a telecommunications switching system that includes a first circuit in each of the first and second paths adapted to receive substantially identical telecommunications signals containing telecommunications data, and transmit substantially identical digital signals containing the telecommunications data. These first circuits are capable of detecting errors in the received telecommunications signals and providing an error indicator in the digital signals in response to the detection of an error. The automatic switching system further includes at least one second circuit in each of the first and second paths for accepting the transmitted digital signals from the first circuit in a selected one of the paths. The second circuit is capable of detecting the presence of the error indicator, and switching to accept the digital signals from the first circuit in the non-selected path in response to detection of the presence of the error indicator.

Further, in accordance with the present invention a method for switching between first and second paths in a telecommunications switching system is also provided. The method includes the steps of receiving substantially identical telecommunications signals containing telecommunications data at a first circuit in each of the first and second paths, detecting by the first circuit whether errors have occurred during the transmission of the telecommunications signals, transmitting from the first circuits substantially identical digital signals containing the telecommunications data, and prior to transmitting the digital signals, providing an error indicator in the digital signals if a telecommunications signal transmission error has been detected. The method further includes the steps of accepting by at least one second circuit in each of the first and second paths the digital signals from the first circuit in a selected path, detecting by the at least one second circuit whether an error indicator is present, and switching to accept the digital signals from the first circuit in the non-selected path in response to detection of the presence of an error indicator.

BRIEF DESCRIPTION OF THE DRAWINGS

For a more complete understanding of the present invention and the advantages thereof, reference is now made to the following description taken in conjunction with the accompanying drawings in which like reference numbers indicate like features wherein:

FIG. 3 is a diagram showing the overhead configuration of an STS-1 digital signal;

FIG. 4 is a diagram showing the configuration of the control field in the overhead of an STS-1 digital signal;

FIG. 5A is a diagram representing a switch in a signal terminator circuit that is configured to receive digital signals from an optical terminator circuit in the same path;

FIG. 5B is a diagram representing a switch in an application circuit that is configured to receive digital signals from an optical terminator circuit in a different path.

DETAILED DESCRIPTION OF THE INVENTION

Figure 1:
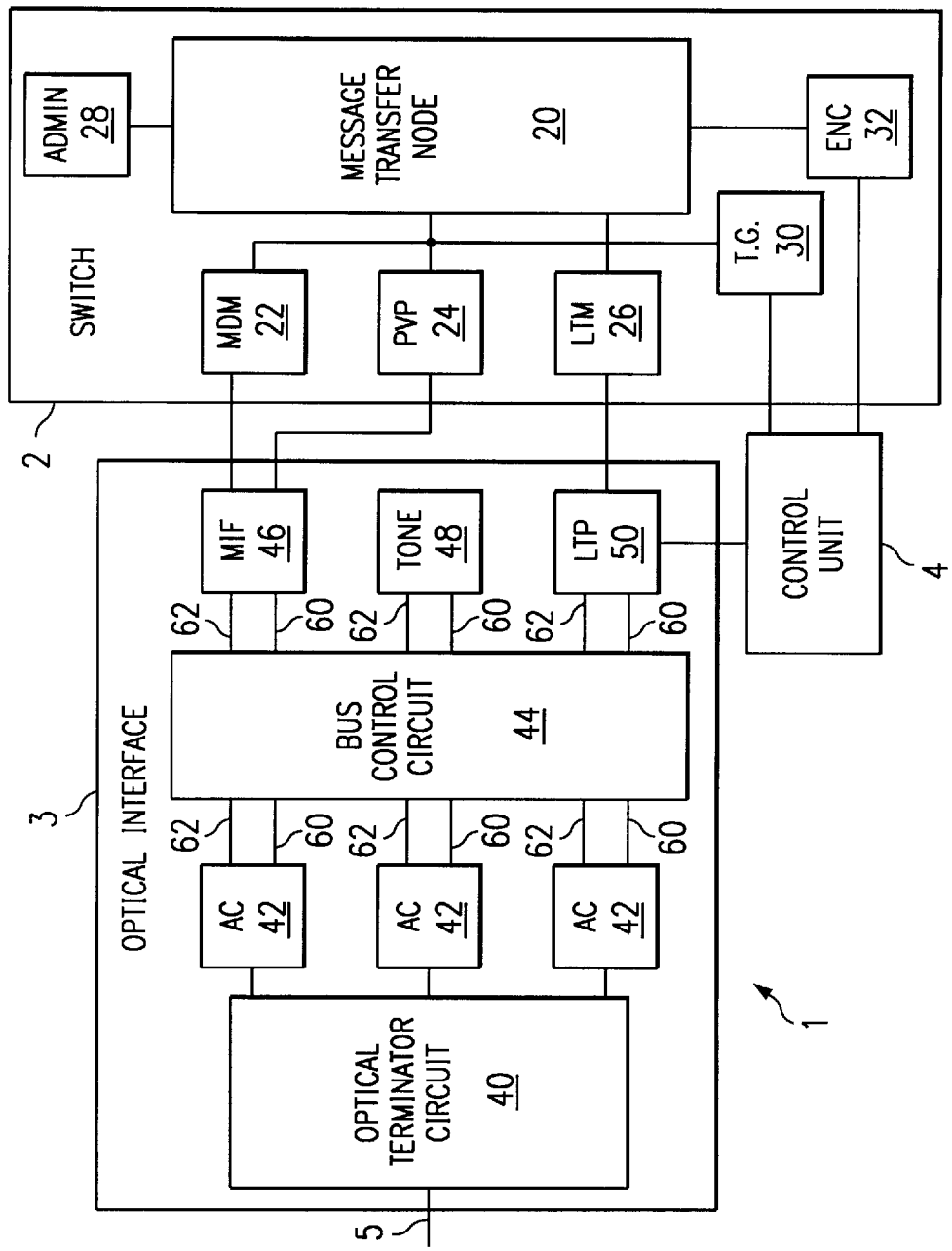
FIG. 1 is a system block diagram of an embodiment of an optical fiber-capable telecommunications switching system.

The overall architecture of a telecommunications switching system 1 within which the automatic switching system and method of the present invention may be employed is shown in FIG. 1. Telecommunications switching system 1 includes a switch 2 that is coupled to an optical interface 3 and a control unit 4. In an optical telecommunications system, optical interface 3 is an interface that receives optical telecommunications signals transmitted over optical conductors 5. The optical telecommunications signals are converted into digital signals by the optical interface 3 and transmitted to switch 2 for switching signals. Control unit 4 monitors and controls the operation of the optical interface by sending control data to and receiving status information from the optical interface 3.

Optical interface 3 includes an optical terminator circuit 40, and signal terminator circuit 42. Optical terminator circuit 40 is capable of terminating optical signals, for example SONET OC-3, connected to the public switched network (PSN). Optical terminator circuit 40 receives digitally encoded optical telecommunications data from fiber optic conductor 5 and converts the optical signals into digital signals, for example three SONET STS-1s, for transmission to the signal terminator circuit 42. Optical terminator circuit 40 is coupled to fiber optic conductor 5 and to signal terminator circuit 42. Optical terminator circuit 40 may include a single circuit card with electronic circuit subcomponents (not explicitly shown) that have plug-in connectors to allow the card to be easily installed in a cabinet containing other component circuit cards of optical interface 3. Alternatively, optical terminator circuit 40 may include two or more circuit cards, or one or more discrete components on a circuit card.

Signal terminator circuit 42 provides the termination of the received digital signals and the multiplexing and demultiplexing to the appropriate signal levels for switching by switch 2. For example, an STS-1 may be terminated and demultiplexed to DS0 level signals for switching by switch 2. Each signal terminator circuit 42 may have a separate circuit card (not explicitly shown) with plug-in connectors in order to be easily installed in a rack containing optical interface 3. Alternatively, signal terminator circuits 42 may comprise multiple circuit cards, or individual components on a single circuit card.

As shown in FIG. 1, signal terminator circuit 42 is configured to receive data from and transmit data to optical terminator circuit 40. This data may comprise synchronous transfer mode telecommunications data. For example, signal terminator circuit 42 may receive three STS-1 signals that each include a plurality of DS0 data channels, where each DS0 data channel is a continuous stream of data equal to 64,000 bits per second. This data would be received in a predetermined format that may include administration data, control data, and payload data.

Control unit 4 is the primary shelf controller for all of the circuit cards in optical interface 3. Control unit 4 contains a microprocessor, and a communications interface to all circuit cards of optical interface 3. Control unit 4 may be embodied as a separate circuit card with plug-in connectors in order to be easily used in a rack containing optical interface 3. Alternatively, control unit 4 may be multiple circuit cards, or individual components on a single circuit card.

Figure 2:
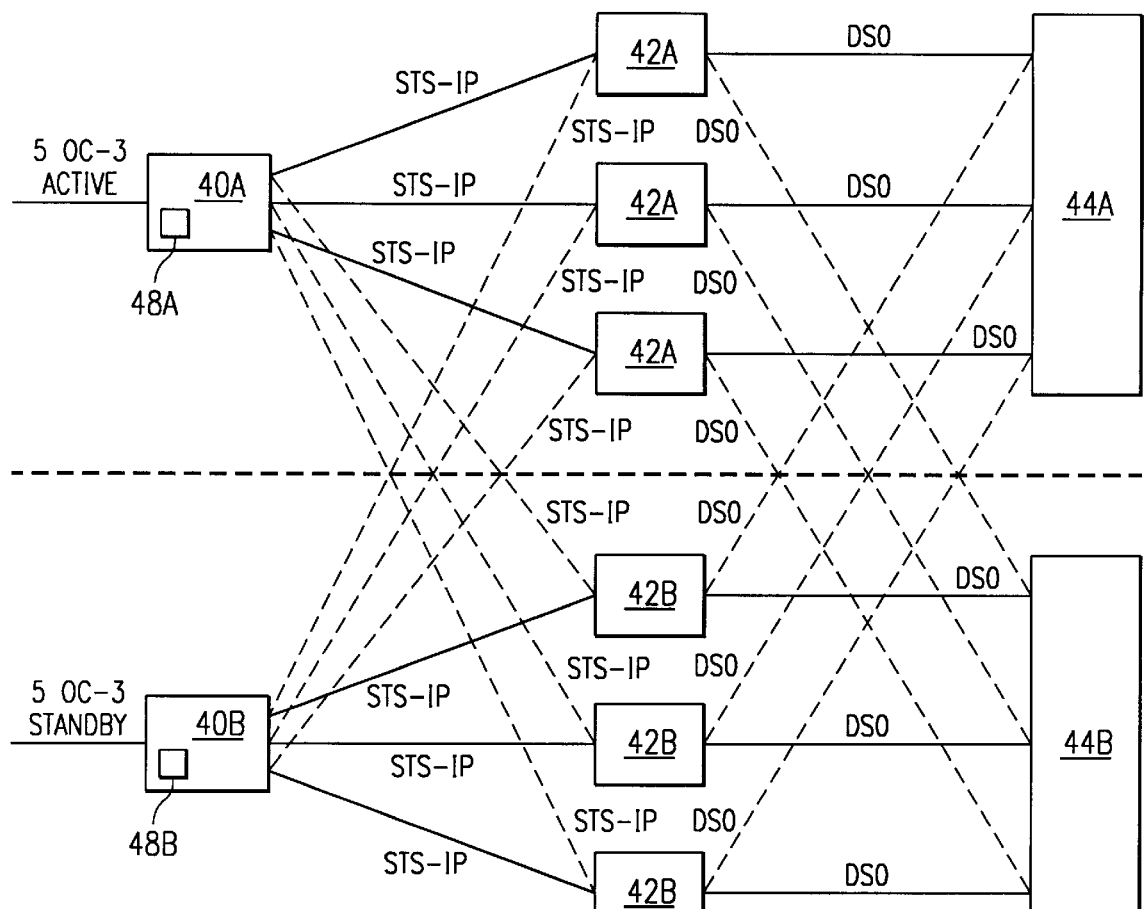
FIG. 2 is a block diagram showing redundant paths A and B of the optical interface of the optical fiber-capable telecommunications switching system.

Optical interface 3 of the telecommunications system 1 described above includes an automatic switching system that enables telecommunications switching system 1 to provide uninterrupted service, even when multiple failures or data transmission errors have occurred. To support automatic switching, substantially redundant optical interfaces are provided in parallel operating paths, as shown in FIG. 2.

Parallel paths A and B of optical interface 3 each receive and process substantially identical copies of telecommunications signals, such as OC-3, transmitted over fiber optic conductor 5 at duplicate optical terminator circuits 40A and 40B. The telecommunications signals received at optical terminator circuits 40A and 40B are identical but for any differences caused by errors or faults that have occurred during transmission of the respective copies of the telecommunications signal. Further, one copy of the telecommunications signal that is received and processed in one path, for example, path A, is designated as the active copy, whereas the duplicate copy is the standby copy.

For each OC-3 signal received at optical terminator circuits 40A and 40B, three proprietary STS-1 digital signals are generated and transmitted to separate, but identical signal terminator circuits 42A and 42B. Signal terminator circuits 42A, 42B select the active STS-1 digital signals as shown by the solid lines. The proprietary STS-1 signals are designated as "STS-1P" in FIG. 2, and the proprietary nature of these signals enables the automatic switching between paths, as will be described in further detail below. Similarly, each signal terminator circuit 42A and 42B transmits a copy of the terminated and demultiplexed data extracted from the STS-1P signals to the switch 4.

In addition to transmitting digital signals and data to the appropriate element in the same path, the optical terminator circuits 40A and 40B and the signal terminator circuits 42A and 42B in each path are "cross-coupled" to like elements in the opposite path. In other words, each element both transmits to and receives digital signals from the appropriate elements in its own path, and transmits to and receives digital signals from corresponding elements in the other path. For example, the signal terminator circuits 42A in path A receive STS-1P signals from optical terminator circuit 40A in path A that has processed the active OC-3 signal, and will also receive STS-1P signals from the optical terminator 40B in path B that has processed the standby OC-3 signal. Although both are transmitted to each signal terminator circuit, only a selected one is accepted by the signal terminator circuit for further processing to extract the signal data for transmission to the switch 2. By means of this cross-coupling and the automatic switching mechanism and process described below, the signal terminator circuits are able to quickly switch to accept for further processing the STS-1Ps transmitted by the optical terminator circuit in the standby path in the event that a transmission error is detected in the active path. This enables data transmission and telecommunications switching operations to continue uninterrupted, even where transmission faults have occurred.

The automatic switching system and method of the present invention will now be described in detail. Switching between paths is performed by the signal terminator circuits 42A and 42B when an error has occurred during transmission of the telecommunications signals. Transmission errors that trigger switching are network errors that are external to the telecommunications switching system 1. Such transmission errors could include loss of signal errors, indicating that the signal can no longer be recognized as valid by hardware elements; loss of frame errors, indicating that the signal can no longer be properly framed; errors that have occurred upstream for which an alarm indicator signal has been transmitted with the telecommunications signal; excessive bit error rates; or signal degrade errors indicating degradation of the signal. Software (48A and 48B in FIG. 2) executing on optical terminator circuits 40A and 40B directs the optical terminator circuits to monitor the incoming OC-3 signals for selected error conditions. When such an error condition is detected, the optical terminator circuits automatically insert an error indicator into the STS-1P digital signal as described below.

An STS-1 signal is a standard digital signal having a particular format that is well known in the art. The STS-1 signal includes an overhead field having several unused or currently undefined bits. FIG. 3 illustrates an STS-1 signal 50 with the overhead field 51 being shaded. The top designation within each field indicates the standard STS-1 definition and the bottom designation indicates the proprietary STS-1P definition. The control field (CNTL) 52, shown in greater detail in FIG. 4, consists of 8 bits, one of which is the STAI (STS-1 alarm indicator) bit 53. In one embodiment, the otherwise unused STAI bit 53 in the STS-1P overhead field is used as the error indicator, and is set by the optical terminator circuit 40A and 40B in response to its detection of a transmission error. It should be recognized that any unused bit in the STS-1 overhead field may also be used as an error indicator.

The setting of STAI bit by optical terminator circuit 40 provides a flag that can be detected by the downstream signal terminator circuit 42, that will trigger signal terminator circuit 42 to automatically switch to accept STS-1P signals transmitted from the optical terminator circuit 40 in the other path. Hardware (59 in FIG. 5A) on signal terminator circuit 42 may be used to monitor the incoming STS-1P signal for the presence of a set STAI bit. A signal terminator circuit switch 60 in each signal terminator circuit 42 is configured so that the signal terminator circuit will by default only accept for further processing the STS-1P signal that has been designated as the active signal, as shown in FIG. 5A. When a set STAI bit is detected, the signal terminator circuit switch 60 is automatically activated so that the signal terminator circuit will only accept for further processing the standby STS-1P signal which then becomes the active STS-1P signal, as shown in FIG. 5B. In this manner, telecommunications switching operations may continue uninterrupted by the faulty signals in the active path, and without requiring communication to and direction from an external unit.

Figure 6:
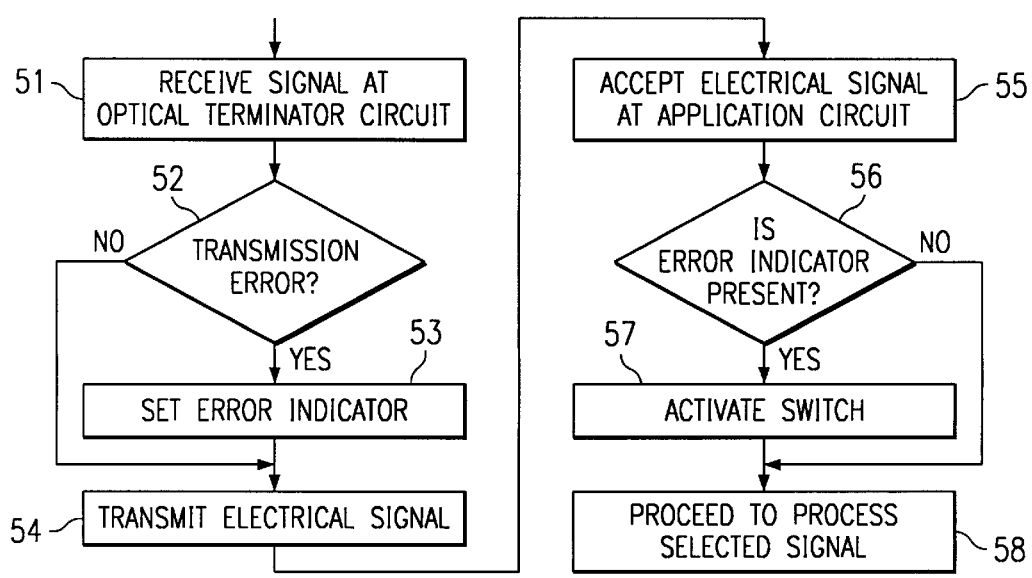
FIG. 6 is a flow chart illustrating the automatic switching process.

With reference now to FIG. 6, the automatic switching process proceeds as follows: optical terminator circuit 40 receives telecommunications signals in the active path at step 51, and by monitoring of the incoming signal determines whether a transmission error has occurred in step 52. If an error has occurred, the optical terminator circuit will provide an error indicator in the digital signal (step 54), such as setting the STAI bit in the STS-1P signal, prior to transmitting that signal to the signal terminator circuit 42 in step 54. Otherwise, the optical terminator circuit will proceed directly to step 54. The signal terminator circuit 42 will monitor the digital signal and determine whether the error indicator is present in the signal in steps 55 and 56. If the error indicator is detected, the signal terminator circuit will activate the switch (step 57) so that the signal terminator circuit will accept for further processing the digital signal from the opposite path. Otherwise, the signal terminator circuit will accept the active signal for further processing.

The automatic switching system and method described above provides a faster and more efficient way for switching between paths in a telecommunications switching system. Further, it has the distinct advantage of being self contained in that the optical interface is capable of implementing automatic switching without communicating with or being directed by an external unit that is outside of the data path. Accordingly, switching can occur in a faster and more reliable manner, causing less disruption to service.

Other modifications of the invention described above will be obvious to those skilled in the art, and it is intended that the scope of the invention be limited only as set forth in the appended claims.

What is claimed is:

1. An automatic switching system for switching between first and second paths in a telecommunications switch system comprising:

a first circuit in each of said first and second paths adapted to receive substantially identical telecommunications signals containing telecommunications data and transmit substantially identical digital signals containing said telecommunications data, said first circuit being capable of detecting selected errors in said received telecommunications signals and providing an error indicator in said transmitted digital signals in response thereto;

at least one second circuit in each of said at least first and second paths for accepting said transmitted digital signals from said first circuit in a selected path, said second circuit being capable of detecting the presence of said error indicator and automatically switching to accept said digital signals from said first circuit in the non-selected path in response thereto.

2. The automatic switching system according to claim 1, wherein said digital signals are STS-1 signals, and said error indicator is a bit in an overhead field of said STS-1 signals.

3. The automatic switching system according to claim 2, wherein said bit in the overhead of said STS-1 signals is the STAI bit.

4. The automatic switching system according to claim 3, wherein said STAI bit is set by said first circuit in response to detection of said error in the transmission of said telecommunications signals.

5. The automatic switching system according to claim 4, wherein said second circuit further comprises a switch that is activated in response to detection of the setting of the STAI bit to cause said second circuit to accept said STS-1 signals from the first circuit in the non-selected path.

6. The automatic switching system according to claim 5, wherein said telecommunications signals include OC-3 optical signals, and wherein said errors detected by said first circuit include loss of signal errors, loss of frame errors, alarm indicator signal errors, bit error rate signals, and signal degrade errors.

7. The automatic switching system according to claim 6, wherein said first circuit is an optical terminator circuit and said second circuit is a signal terminator circuit.

8. The automatic switching system according to claim 7, wherein said automatic switching is completed within 50 milliseconds of setting of said STAI bit by said optical terminator circuit.

9. A method for automatically switching between a first and second path in a telecommunications switching system, comprising the steps of:

receiving substantially identical telecommunications signals containing telecommunications data at a first circuit in each of said first and second paths;

detecting by said first circuits whether selected errors have occurred during the transmission of said telecommunications signals;

transmitting from said first circuits digital signals containing said telecommunications data;

prior to transmitting said digital signals, providing an error indicator in said digital signals if a telecommunications signal transmission error has been detected;

accepting by at least one second circuit in each of said at least first and second paths said digital signals from the first circuit in a selected path;

detecting by said at least one second circuit whether said error indicator is present; and automatically switching to accept said digital signals from the first circuit in the non-selected path in response to detection of the presence of said error indicator.

10. The method according to claim 9, wherein said digital signals are STS-1 signals, and said error indicator is a bit in an overhead field of said STS-1 signals.

11. The method according to claim 10, wherein said bit in the overhead of said STS-1 signal is the STAI bit.

12. The method according to claim 11, wherein said step of providing an error indicator further comprises setting said STAI bit.

13. The method according to claim 12, wherein said switching step further comprises activating a switch to cause said second circuit to accept said STS-1 signals from the first circuit in the non-selected path in response to detection of said error indicator.

14. The method according to claim 13, wherein said telecommunications signals include OC-3 signals, and said selected telecommunications signal transmission errors include loss of signal errors, loss of frame errors, alarm indicator signals, bit error rate signals, and signal degrade errors.

15. The method according to claim 14, wherein said first circuit is an optical terminator circuit and said second circuit is a signal terminator circuit.

16. The method according to claim 15, wherein said automatic switching step is performed within 50 milliseconds of setting of said STAI bit by said optical terminator circuit.

* * * * *